United States Patent
Bussey, Jr. et al.

(10) Patent No.: US 8,061,020 B2
(45) Date of Patent: Nov. 22, 2011

(54) APPARATUS FOR MAKING DRAINAGE ELEMENT WITH A PERIPHERY OF DIFFERENT MATERIALS

(75) Inventors: Harry Bussey, Jr., Marco Island, FL (US); Buddy Harry Bussey, III, Atlantic Highlands, NJ (US)

(73) Assignee: ICC Technologies Inc., Marlboro, NJ (US)

( * ) Notice: Subject to any disclaimer, the term of this patent is extended or adjusted under 35 U.S.C. 154(b) by 450 days.

(21) Appl. No.: 12/315,575

(22) Filed: Dec. 4, 2008

(65) Prior Publication Data
US 2009/0092445 A1 Apr. 9, 2009

Related U.S. Application Data

(60) Division of application No. 11/637,534, filed on Dec. 12, 2006, which is a continuation-in-part of application No. 11/591,420, filed on Nov. 2, 2006, now Pat. No. 7,475,477.

(51) Int. Cl.
*B01D 24/00* (2006.01)

(52) U.S. Cl. ....... 29/819; 29/820; 29/896.62; 29/525.01

(58) Field of Classification Search ............... 29/417, 29/779, 819, 820, 525.01, 896.62, 525.14; 53/576, 469, 473, 435, 409; 405/36, 43, 405/45, 50
See application file for complete search history.

(56) References Cited

U.S. PATENT DOCUMENTS

| | | | | |
|---|---|---|---|---|
| 4,104,774 A | * | 8/1978 | Overmyer et al. | 29/234 |
| 5,051,028 A | * | 9/1991 | Houck et al. | 405/45 |
| 6,497,031 B1 | * | 12/2002 | Houck et al. | 29/429 |
| 6,854,924 B2 | * | 2/2005 | Ring | 405/45 |
| 7,178,224 B2 | * | 2/2007 | Bussey et al. | 29/728 |
| 2003/0097827 A1 | * | 5/2003 | Bussey et al. | 53/551 |
| 2006/0075619 A1 | * | 4/2006 | Bussey et al. | 29/429 |

* cited by examiner

*Primary Examiner* — Jermie Cozart
(74) *Attorney, Agent, or Firm* — Francis C. Hand; Carella, Byrne, Cecchi

(57) ABSTRACT

The drainage element is made with a periphery formed of a filter material that allows the passage of water and prevents the passage of soil and a second peripheral section of net material that allows the passage of water while the preventing the passage of the lightweight aggregate therein. The filter material is preferably made of spun bonded polyester and may be made of a biodegradable material such as starch.

11 Claims, 7 Drawing Sheets

APPARATUS FOR MAKING DRAINAGE ELEMENT WITH A PERIPHERY OF DIFFERENT MATERIALS

This is a Division of U.S. Ser. No. 11/637,534, filed Dec. 12, 2006 which is a Continuation-in-Part of U.S. Ser. No. 11/591,420, filed Nov. 2, 2006, now U.S. Pat. No. 7,475,477.

This invention relates to an apparatus for making a drainage element having a periphery formed of different materials. More particularly, this invention relates to a drainage element for use in a sewage field, water drainage field, roadside drainage ditches and the like.

As is known, drainage elements have been constructed of loose aggregate, such as foam plastic elements, beads, and other light weight materials all encased in a net-like sleeve. In some cases, a perforated plastic pipe has been incorporated in the drainage element. Various techniques have also been known for making such drainage elements in a manufacturing plant so that the individual drainage elements may then be shipped to a construction site for use. Examples of such techniques are described in U.S. Pat. Nos. 5,015,123; 5,154,543; 5,535,499; 5,657,527; and 6,173,483.

Further, use of a netting to contain the aggregate within the drainage elements while allowing water and/or effluent to pass through also allows fine particles of solid material to pass through into the aggregate from the surrounding environment. As a result, over time, the solid material can build up in the drainage element to such a degree that the drainage element becomes clogged and prevents a flow of water therethrough. In some cases, use has been made of covers in order to prevent top dirt fill from falling into the drainage elements. In other cases, such as described in U.S. Pat. No. 6,854,924, proposals have been made to incorporate a barrier material in a drainage element between the netting and the aggregate to prevent the passage of outside media, such as sand, dirt and soil, through the netting.

In cases where a tubular netting is used in the fabrication of a drainage element of the above type, the tubular netting needs to be rucked onto a tube, i.e. drawn concentrically over the tube and gathered together. Thereafter, the netting can be drawn off the tube as the netting is filled with aggregate. Typically, the length of netting rucked onto a tube is sufficient to fabricate several drainage elements. However, rucking of the netting onto a tube is time consuming and cumbersome.

Also, as described in co-pending patent application U.S. Ser. No. 11/591,420, filed Nov. 2, 2006, use is made of a membrane to encase a mass of light weight aggregate to form a drainage element that allows water to pass through but prevents the passage of soil particles into the aggregate.

U.S. Pat. Nos. 6,857,818, and 6,988,852, describe a drainage element having a casing with a first part-circumferential portion, such as a netting, having a plurality of openings therein for passage of water and a second part-circumferential portion, such as a plastic web, having a porosity to prevent the passage of water therethrough.

It is an object of this invention to provide a drainage element that employs a sleeve to encase light weight aggregate that is able to allow the passage of water while blocking the passage of soil.

It is another object of the invention to provide a simple apparatus for fabricating a drainage element with an encasing sleeve with different filtering characteristics.

It is an object of this invention to provide a drainage element of light weight aggregate with a porous net section that allows water to readily pass through and a tough tear resistant section that prevents soil particles from passing through while allowing water to pass through.

It is another object of the invention to avoid the need to ruck a tubular netting onto a tube in order to fabricate a drainage element with light weight aggregate.

Briefly, the invention provides a drainage element that is comprised of a mass of discrete lightweight aggregate that defines passageways for a flow of fluid therethrough and a sleeve encasing the mass of discrete aggregate. In accordance with the invention, the sleeve includes a first peripheral portion of a water permeable filter material and a second peripheral portion of net material having openings for retaining the aggregate and allowing the passage of water.

In one embodiment, the filter material is a membrane having a plurality of interstices characterized in being of a size for the passage of water therethrough and the filtering of fine particles of solid material from the water passing through the membrane. The membrane is further characterized in being tear resistant. For example, the membrane, as described in the parent application, has a grab tensile strength of 61/61, LBF as measured under ASTM D-5034, and a grab elongation to break in percentage of 45/50, as measured under ASTM D-5034. Preferably, the membrane is made of spun bonded non-woven polyester.

In another embodiment not requiring tear strength, the filter material is made of a biodegradable material such as starch.

The invention also provides an apparatus for making the drainage element.

In one embodiment, the apparatus employs a tube for passing light weight aggregate therethrough and a supply means for supplying a web about said tube that is formed of a net strip secured to a filter material strip along respective longitudinal edges thereof. The supply means includes a first station for supplying the net strip, a second station for supplying the filter material strip and a securing means for securing a longitudinal edge of net strip to a longitudinal edge of the filter material strip to form the web.

The apparatus also includes a forming means for shaping the supplied web about the tube to dispose longitudinal edges of the web in overlapping relation. The forming means may be a forming collar that is disposed about the tube or a plurality of longitudinally spaced pairs of guide plates that are angularly disposed about the tube in a progressive pattern to bring the edges of the web into overlapping relation.

The apparatus also employs a securing means for securing the overlapped edges of the web together to form a sleeve about said tube and, as described in the parent patent application, means for moving a flow of aggregate through the tube for filling the sleeve with aggregate, means for moving the sleeve from the tube during filling of the sleeve with aggregate and means for moving the sleeve from the tube during filling of the sleeve with aggregate.

In another embodiment, the apparatus employs a tube, as above, for passing a flow of aggregate therethrough and a pair of forming collars. One forming collar is positioned relative to the tube for shaping a continuously supplied filter material strip having a pair of longitudinal edges about the tube and the second forming collar is positioned relative to the tube for shaping a continuously supplied net strip about the tube. The second forming collar is also disposed relative to the first forming collar to overlap the longitudinal edges of the filter material strip with the respective longitudinal edges of the net strip.

In this embodiment, apparatus also includes means for securing the overlapped edges of the filter material strip and net strip together along two seams to form a sleeve about the tube and, as described above, tying means spaced from the tube for intermittently applying ties about the sleeve to close the sleeve on itself, means for moving a flow of aggregate through tube for filling the sleeve with aggregate and means for moving the sleeve from the tube during filling of the sleeve with aggregate.

The drainage elements may be particularly used for draining water from fields into water collecting pipelines or ponds or the like. For example, a series of drainage elements may be laid in a linear array in a trench and covered over with backfill with the filter material side up and the first drainage element in the series connected via a coupling to a storm sewer pipe or lateral pipe. In this case, water that passes through the filter material of each drainage element would flow under gravity from one drainage element to the next and down to the storm sewer pipe or lateral. In order to insure that soil does not fill up the spaces between adjacent drainage elements, a strip of filter material is bridged over the ends of two adjacent drainage elements and secured in place by an adhesive or other suitable securing means. This strip serves to prevent fine particles from passing into the space between the two adjacent drainage elements while allowing water to pass through.

The use of a filter material that is biodegradable is particularly useful in situations where the trench in which the drainage elements are placed is backfilled with clay soils and/or compacted to such a degree that, over time, a "worm hole" is formed in the soil by the drainage elements. In such cases, the filter material can biodegrade while allowing the surrounding soil to maintain the light weight aggregate in place.

These and other objects and advantages of the invention will become more apparent from the following description taken in conjunction with the accompanying drawings wherein.

Figure 1:
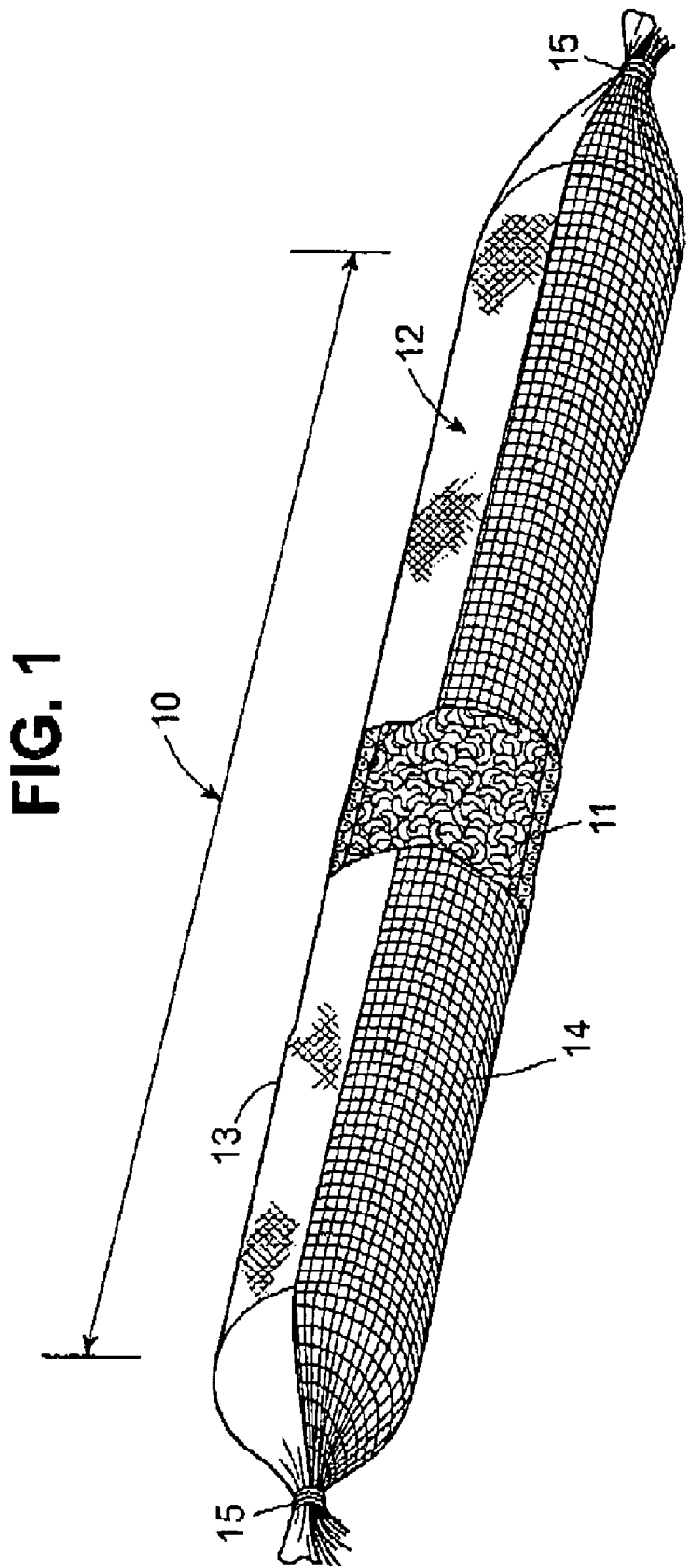
FIG. 1 illustrates a perspective view of a drainage element in accordance with the invention.

Referring to FIG. 1, the drainage element 10 is formed of a mass 11 of discrete lightweight aggregate, such as loose fill thermoplastic elements, that define passageways for a flow of fluid therethrough and a sleeve 12 that encases the mass of aggregate 11. The sleeve 12 includes a first peripheral portion 13 of a water-permeable filter material and a second peripheral portion 14 of net material. The filter material in this embodiment is a membrane material that is characterized as having a plurality of interstices that are of a size for the passage of water and the filtering of fine particles of solid material from the water passing though the membrane. The membrane material is of a nature as described in the above noted co pending parent patent application.

The net material is characterized in having openings for retaining the aggregate 11 and allowing the passage of water, for example, of a size of from 1/16 inch to 1 inch.

Each end of the drainage element 10 is closed by means of a tie 15 that closes around a gathered end of the sleeve 12 to retain the aggregate in place. Each tie 15 may be in the form of a conventional tie for holding the gathered ends of the sleeve 12 together.

The membrane 12 is made of a spun bonded non-woven polyester having a grab tensile strength of 61/61, pounds per foot (lbf) as measured under ASTM Stand D-5034 as well as a grab elongation to break in percentage (%) of 45/50, as measured under ASTM Standard D-5034. Any other suitable type of membrane material may also be used provided it has sufficient tear strength and the permeability of the membrane 12.

Figure 2:
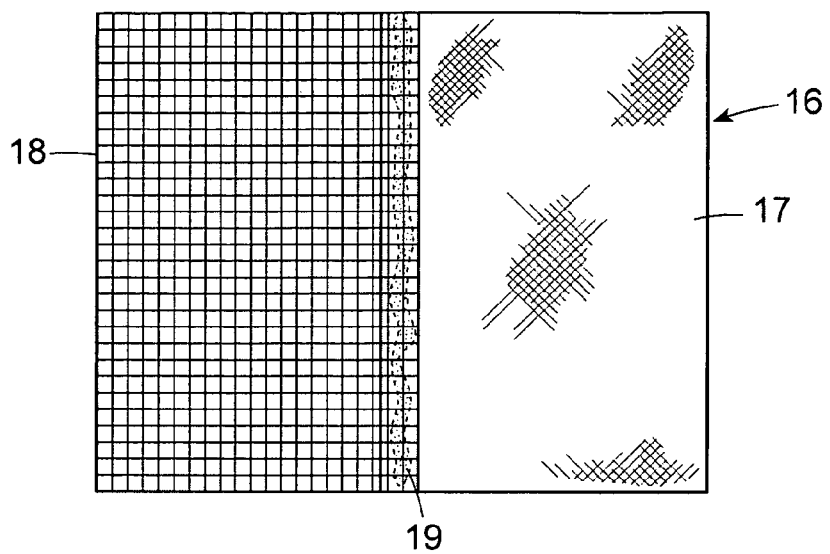
FIG. 2 illustrates a broken away view of a web of material for forming a sleeve for the drainage element of FIG. 1.
Figure 3:
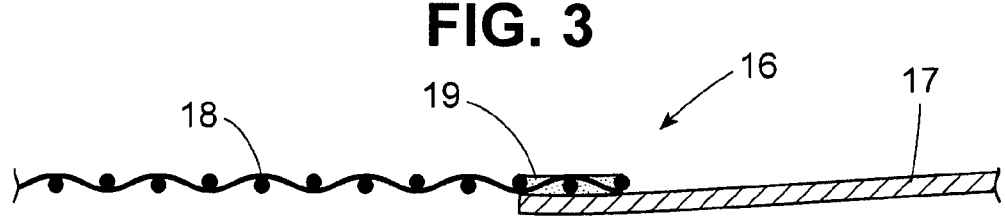
FIG. 3 illustrates a cross sectional view of a seam of the web of FIG. 2.

Referring to FIG. 2, the sleeve 12 is fabricated from a web 16 as illustrated in FIG. 2 having a strip 17 of web material secured to a strip 18 of net material. In this regard, the longitudinal edges of the two strips 17, 18 are disposed in overlapping relation as indicated in FIG. 3 and are secured together by an adhesive 19 to form a seam. The adhesive may be, for example, an EVA modified thermoplastic #GIA1051, purchased from Glue Machinery Corp. of Baltimore, Md.

Figure 4:
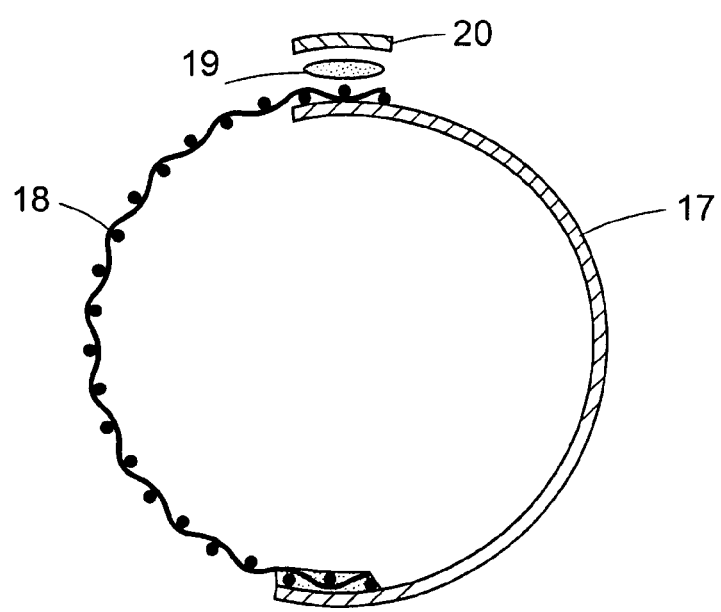
FIG. 4 illustrates a cross sectional view of a modified seam of the web of FIG. 2.

In another embodiment, as indicated in FIG. 4, a third strip 20 of membrane material may be disposed over the overlapped edges of the strips 17, 18 so that the net strip 18 is sandwiched between two membrane strips 17, 20 and secured together by adhesive 19 to form a seam.

Alternatively, the strips 17, 18 may be sewn together in overlapping relation. In this case, the edges of the two strips 17,18 are be turned outwardly and brought into parallel relationship to each other to allow sewing of the outturned edges together.

Figure 5:
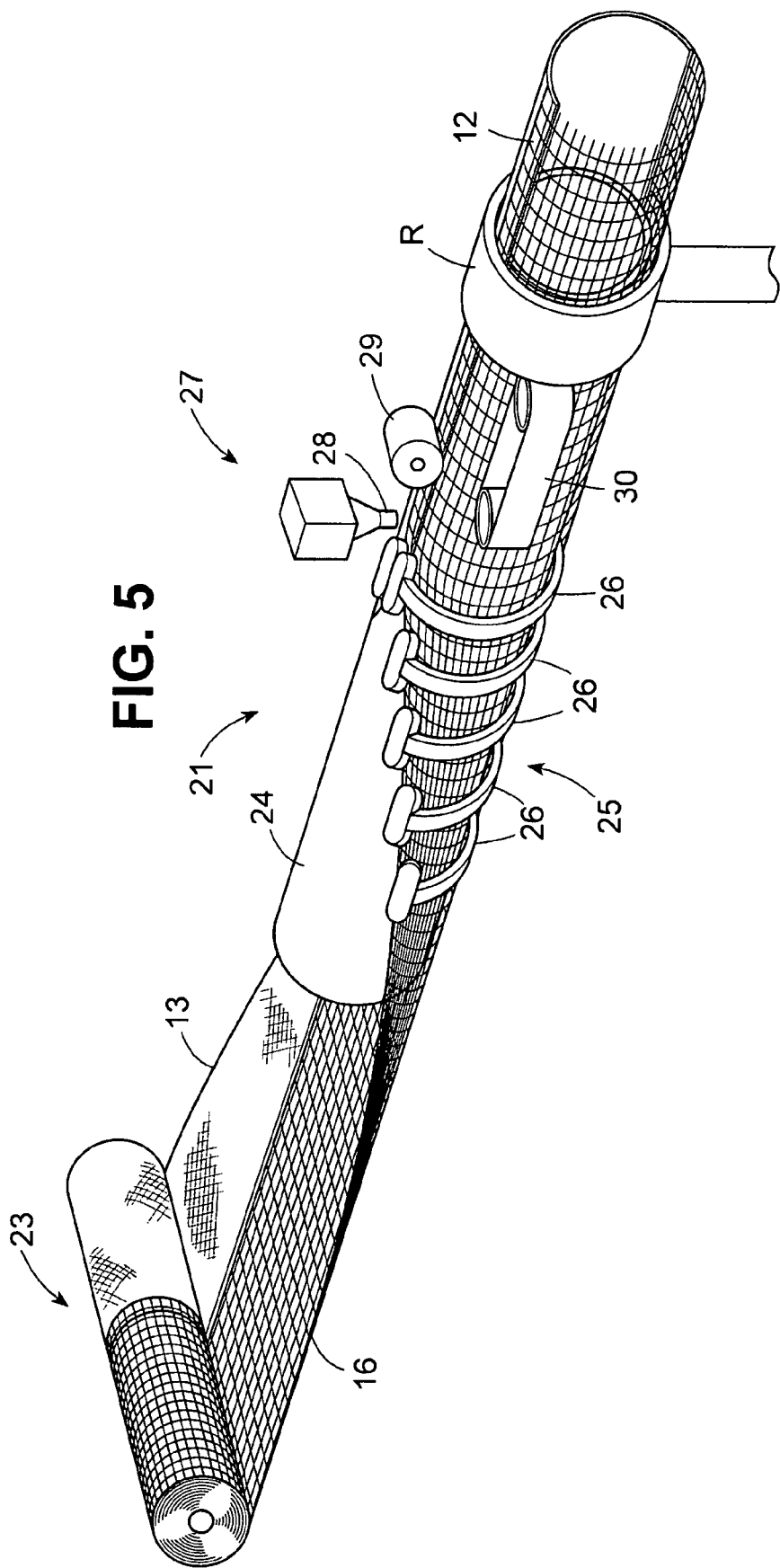
FIG. 5 illustrates an apparatus for fabricating the drainage element of FIG. 1 employing a series of guide plates.
Figure 6:
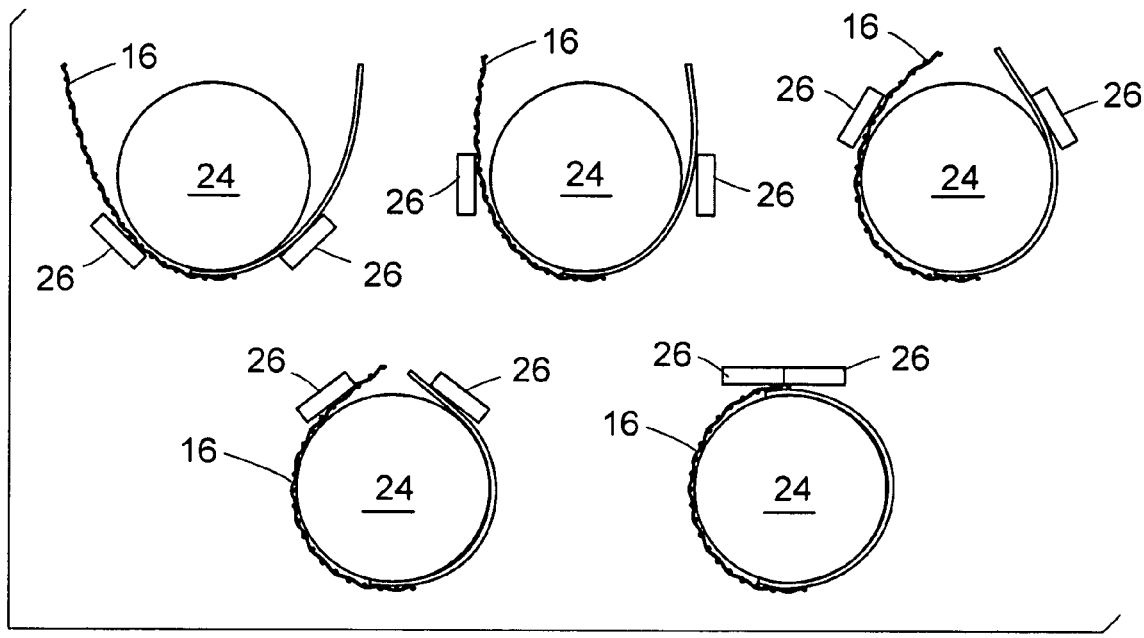
FIG. 6 illustrates the angular arrangement of the guide plates of FIG. 5.

Referring to FIG. 5, an apparatus 21 for forming the drainage element 10 includes a supply station having means (not shown) to support a roll 23 of the web material 16 for delivery to a tube 24 disposed on a horizontal axis. As indicated in FIGS. 5 and 6, a forming means 25 in the form of a plurality of longitudinally spaced pairs of guide plates 26 are angularly disposed about the tube 24 in a progressive pattern. Each pair of guide plates 26 serves to guide the delivered web 16 about the tube 24 in order to progressively bring the longitudinal edges of the web 16 into overlapping relation as indicated in FIG. 6.

The apparatus 21 also includes a securing means 27 for securing the overlapped edges of the web 16 together to form the sleeve 12 about the tube 24. This securing means 27 includes a valve 28 for expelling adhesive between the net strip 18 and the membrane strip 17 as well as a pressing roller 29 to press the two strips 17,18 and adhesive 19 together to form a strong seam.

As illustrated, a puller or capstan arrangement 30 is provided for moving the sleeve 12 from the tube 24.

Referring to FIG. 5, a choke ring R is disposed about the tube 24 near the outlet end and about the sleeve 12 in order to prevent air escaping from the outlet end of the tube 24 from backing between the sleeve 12 and the tube 24 to such an extent that the force of the air would tear apart the seam(s) formed in the sleeve 12 before the adhesive 19 has set. This choke ring R is supported by a vertical column and is of an inside diameter slightly greater than the outside diameter of the tube 24 plus twice the thickness of the sleeve 12 so that a small annular clearance is provided for passage of the sleeve 12.

A cooling means, such as a fan (not shown) may also be provided on the apparatus 21 for cooling the adhesive 19 after application. Also, holes (not shown) may be provided in the tube 24 to allow air to flow radially outward in the vicinity of the seam(s) to cool the adhesive 19. In either case, cooling of the adhesive 19 after application will speed up the setting of the adhesive and the seam(s).

The remainder of the apparatus is as described in above-noted co pending parent patent application which is incorporated by reference herein.

Figure 7:
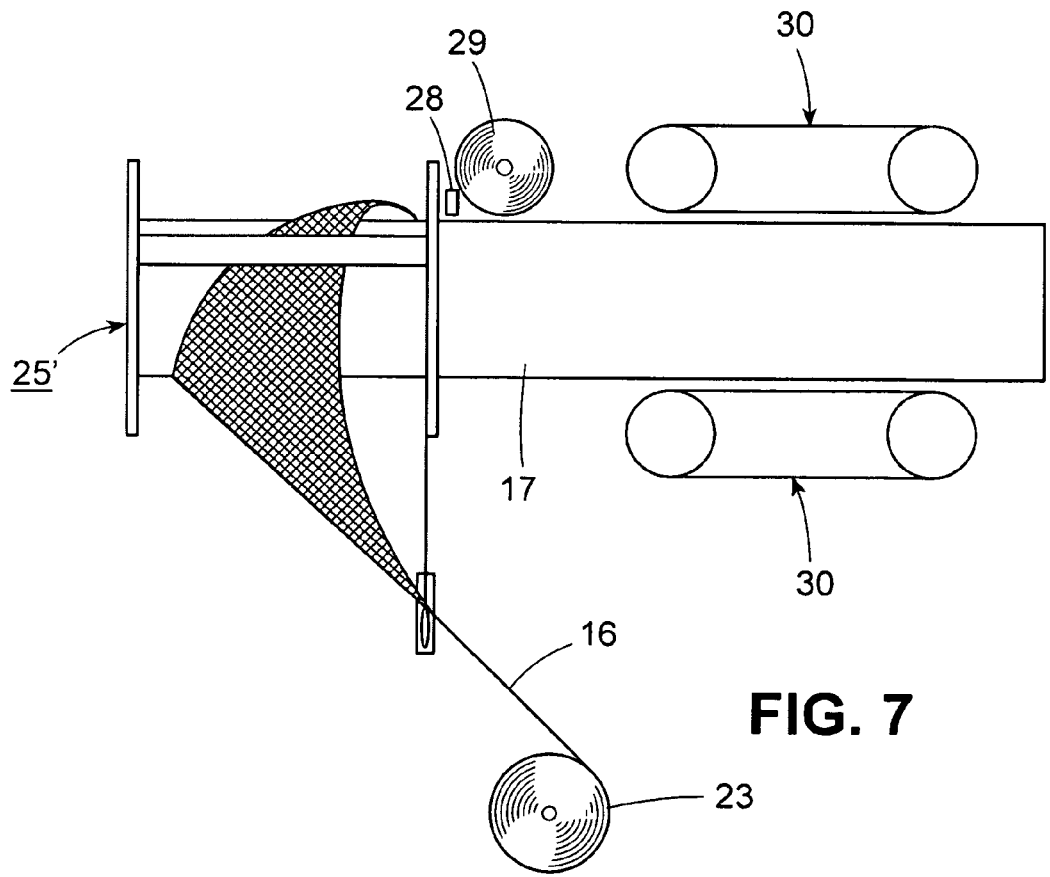
FIG. 7 illustrates a modified apparatus for fabricating the drainage element of FIG. 1.

Referring to FIG. 7, wherein like reference characters indicate like parts as above, the forming means 25' for shaping the web about the tube may be the form of a forming collar of conventional structure, such as described in the above noted co pending patent application.

The apparatus for forming the drainage element 10 may also employ separate stations (not shown) for supplying the respective strips of mesh material 17 and net material 18. In this embodiment, the two strips 17, 18 are separately supplied and move to a securing means (not shown) for securing longitudinal edges of the two strips together to form the web 16.

Figure 8:
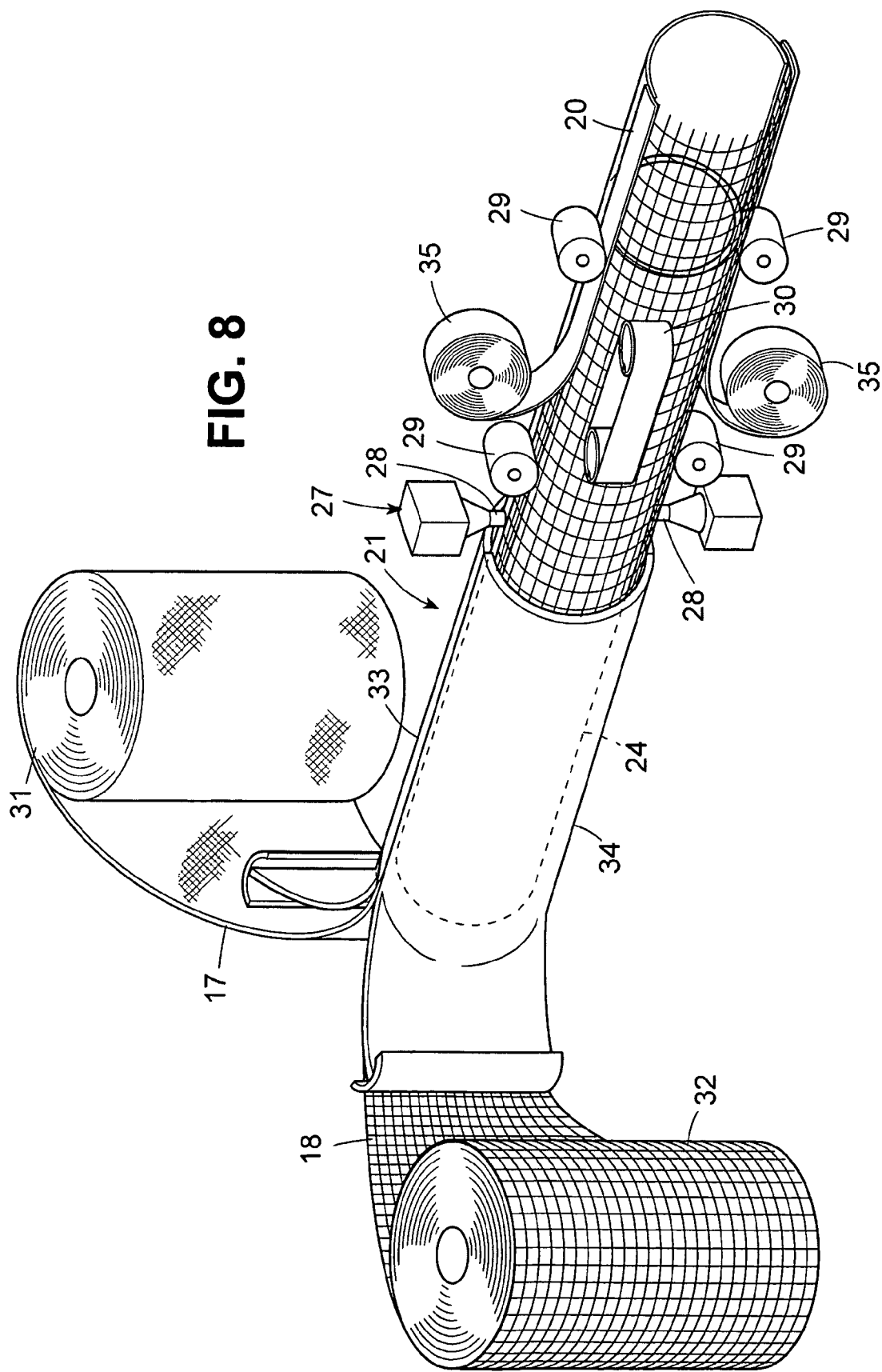
FIG. 8 illustrates a further modified apparatus for fabricating the drainage element of FIG. 1.

Referring to FIG. 8, wherein like reference characters indicate like parts as above, in still another embodiment, the two strips of membrane material 17 and net material 18 may be separately delivered to the tube 24 from separate supply stations 31, 32 and individually shaped by a respective forming collar 33, 34 into a semi-cylindrical shape with the edges of the respective strips 17, 18 disposed in overlying relation. These forming collars 33, 34 are in the form of a double forming collar manufactured by DSL of Houston, Tex.

In this case, a pair of valves 28 are disposed on opposite sides of the tube 24 for expelling adhesive 19 between the edges of the membrane and the net strips 17,18 and an overlying membrane strip 20 as above that is delivered from a roll 35. Likewise, a pair of pressing rollers 29 are provided with each roller 29 being disposed on an opposite side of the tube 24 from the other in order to press the overlapped edges of the membrane strips 17, 20 and net strip 18 together to form two seams when forming the sleeve 12. The remainder of the apparatus is as described in the above-noted co pending parent patent application.

Figure 9:
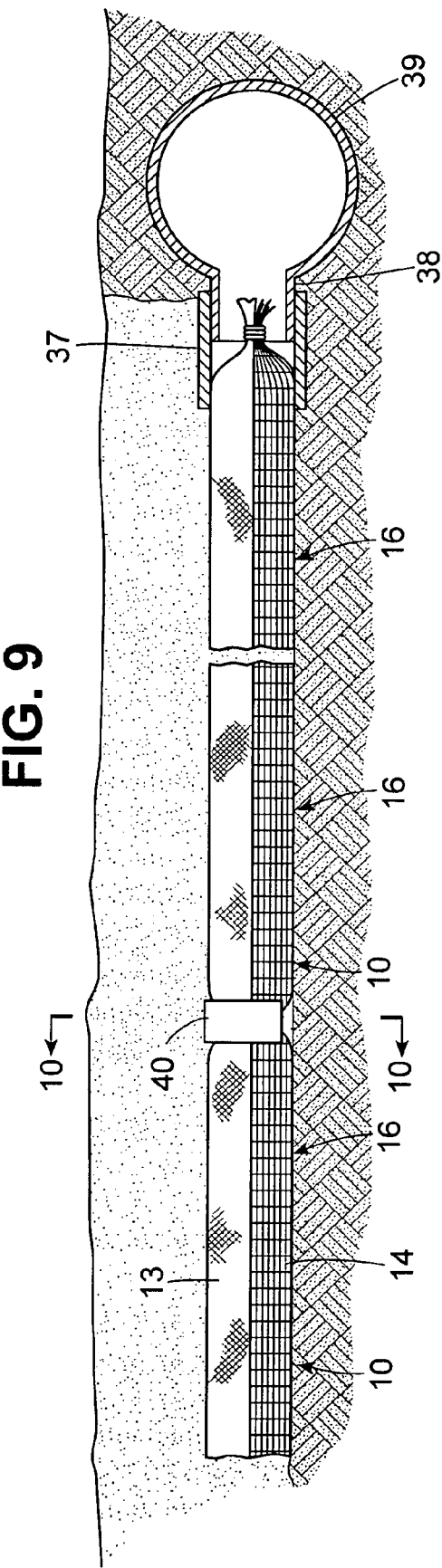
FIG. 9 illustrates a partially broken view of a water drainage system employing the drainage elements of the invention.
Figure 10:
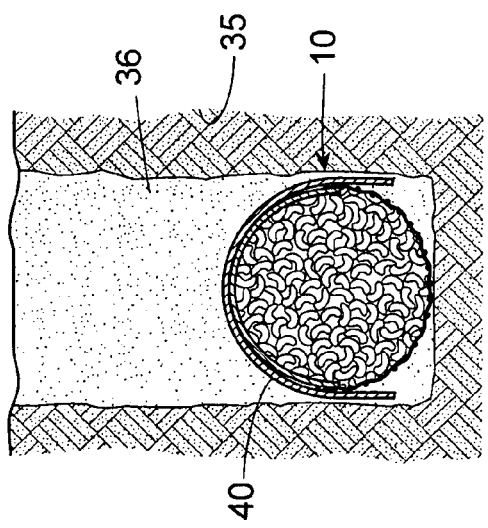
FIG. 10 illustrates a view taken on line 10-10 of FIG. 9.

Referring to FIGS. 9 and 10, wherein like reference characters indicate like parts as above, the drainage elements 10 are particularly useful in a water drainage system for draining a field of water. For example, as shown, a series of drainage elements 10 are placed in linear alignment in a trench 35 with the net side 14 of each element placed down and with the membrane side 13 placed up. After the drainage elements 10 are placed in the trench 35, backfill material 36 is deposited into the trench 35 to cover over the drainage elements 10. Since the membrane material only permits water to pass through, the soil from the backfill material 36 is prevented from passing into the drainage elements 10. The first drainage element 10 in the series is also connected via a suitable coupling 37 to a lateral pipe 38 that, in turn, connects to a storm sewer pipe 39 so that the water collected by the drainage elements 10 can flow under gravity from drainage element 10 to drainage element 10 and then to the pipes 38,39.

Where the lateral pipe 38 is a 4 inch pipe, the first drainage element 10 has a diameter of 4 inches and is coupled to the pipe 38 by a suitably sized coupling 37. In a case where the drainage element 10 has a larger diameter, the drainage element 10 may be provided with a short length of pipe (not shown) at the foremost end, for example, as described in the parent patent application U.S. Ser. No. 11/591,420, that is, in turn, coupled to the lateral pipe 38.

As illustrated, a strip 40 of the membrane material is bridged over the ends of two adjacent drainage elements 10 and secured in place by an adhesive or other suitable securing means (not shown). This strip 40 serves to prevent fine particles from passing into the space between the two adjacent drainage elements 10 while allowing water to pass through. The strip 40 may be applied at the place of manufacture of the drainage elements 10 or may be applied manually in the field. For example, when applied at the place of manufacture, the strip 40 may be applied automatically about the entire circumference of the joint between two drainage elements 10. When applied in the field, the strip 40 would lay over about 180°, of the circumference of a drainage element 10, i.e. the upper half. The strip 40 is of any suitable width so long as the gap between two drainage elements is bridged over.

Alternatively, any other type of cover to prevent the passage of soil may be used in place of the strip 40. For example, a rigid U-shaped cover of solid material may be used.

The tear resistant nature of the membrane material allows the drainage element 10 to be roughly handled when being placed in a trench 35 in the field. This, in turn, reduces the risk that the membrane might be punctured or otherwise compromised by shovels or like equipment used to spread the backfill material 36 over the drainage element 10.

Figure 11:
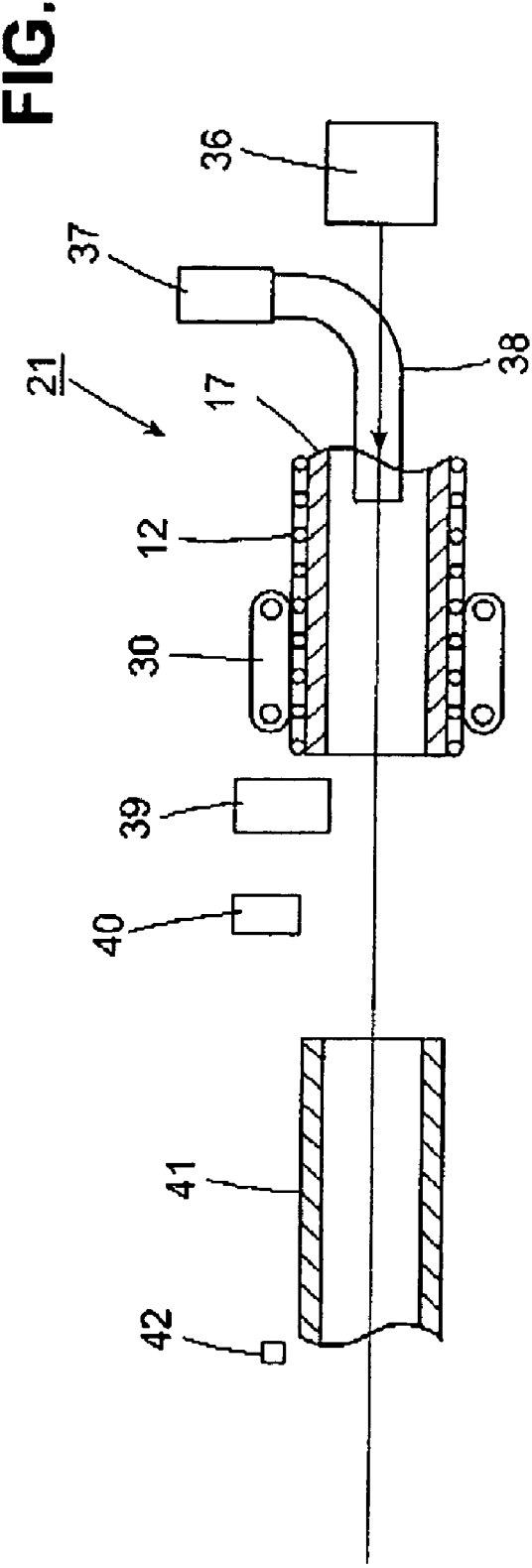
FIG. 11 illustrates a schematic view of the apparatus of FIG. 5.

Referring to FIG. 11, wherein like reference characters indicate like parts as above, the apparatus 16 includes a hopper (not shown) for receiving loose fill elements, the elongated sleeve 11 that extends horizontally from the hopper, a means in the form of a blower 36 for blowing the loose fill elements from the hopper into the sleeve 12 and the capstan arrangement 30 near one end of the tube 24 for feeding the sleeve 12 off the tube 24.

A drive means 37, such as a perforated pipe feeder, is provided for intermittently moving a continuous length of perforated pipe 38 coaxially through the tube 24 into a rear of the sleeve 12 while filling the sleeve with aggregate. When this option is used, the loose fill elements surround the pipe in a circumferential manner within the tube 24.

Alternatively, a means may be provided for guiding a length of material through the tube 24 while dispensing the aggregate into an annular space between the length of material passing out of tube 24 and the sleeve 12 with the sleeve 12 secured at one end to and moving with the length of material.

In addition, the apparatus includes a means 39 spaced from the tube 24 for intermittently applying the ties 15 to the gathered ends of the sleeve 12 as well as a cutting means 40 for cutting through the gathered ends of the sleeve 12 and any pipe 38 thereat.

In addition, a sleeve 41 is spaced from the tube 24 to receive the forward end of a drainage element (not shown) that is being fabricated. A sensor 42 is also disposed within the sleeve 41 at a pre-determined point for sensing the forward end of a drainage element being fabricated.

The construction of the drainage element is such as to avoid the need to have separate layers of material incorporated in a drainage element to prevent the passage of soil. Likewise, the need for placing a layer of paper over the length of the drainage element after placement in a trench to prevent soil infiltration is unnecessary.

The drainage element may be provided with a pipe that extends entirely through the drainage element and out each end or with a short length of pipe that extends from only one end, as described in the above-noted co pending parent patent application.

Where tear strength is not a factor but biodegradability is a factor, the filter material may be made of a biodegradable material, such as strarch. In such cases, the apparatus and methods described above are used in the same manner to make the drainage elements. Also, the third strip of material to form a seam in the sleeve may be made of the same filter material or other suitable material.

The drainage element may be used in a horizontal disposition in a trench or the like as well as in a vertical disposition. For example, where a field, such as a golf course, or ball playing field, accumulates water after a rainstorm in a pond-like manner due to an almost impervious layer of soil at that location, the drainage elements may be used to drain the water. In such cases, a plurality of vertically disposed holes are drilled or otherwise formed through the impervious layer to a more water pervious layer, the drainage elements are placed vertically in the holes and a suitable backfill placed over the drainage elements to close the holes. Accumulated water can then drain downwardly through the drainage elements to the more water pervious layer to be drained away. This technique avoids the need to dig a trench through the field using equipment that would otherwise damage areas of the field surrounding the areas that accumulate water. In these cases also, the drainage elements may be fabricated as above with a membrane material completely or only partially enveloping the loose fill aggregate or may be fabricated with a net completely enveloping the loose fill aggregate.

What is claimed:

1. An apparatus for making a drainage element comprising a tube for passing light weight aggregate therethrough;
supply means for supplying a web about said tube, said web having a first longitudinal net strip secured to a second longitudinal filter strip along respective longitudinal edges thereof; said filter strip characterized in being permeable to the passage of water therethrough and impermeable to the passage of fine particles of solid material from the water passing through said filter material and said mesh material has a regular pattern of openings of a size of from 1/16 inch to 1 inch;
forming means for shaping the supplied web about the tube to dispose longitudinal edges of said web in overlapping relation;
securing means for securing the overlapped edges of said web together to form a sleeve about said tube;
tying means spaced from said tube for intermittently applying a tie about said sleeve to close said sleeve on itself; and
means for moving said sleeve from said tube.

2. An apparatus as set forth in claim 1 wherein said supply means includes a first station for supplying a first strip of mesh material, a second station for supplying a second strip of filter material and a securing means for securing a longitudinal edge of said first strip to a longitudinal edge of said second strip to form said web.

3. An apparatus as set forth in claim 1 wherein said forming means includes one of a forming collar about said tube and a plurality of longitudinally spaced pairs of guide plates angularly disposed about said tube in a progressive pattern.

4. An apparatus for making a drainage element comprising
a tube for passing a flow of aggregate therethrough;
a first forming collar for shaping a first continuously supplied filter material strip having a pair of longitudinal edges about said tube;
a second forming collar for shaping a continuously supplied net strip having a pair of longitudinal edges about said tube; said second forming collar being disposed relative to said first forming collar to overlap the longitudinal edges of the membrane strip with the respective longitudinal edges of the net strip;
first means for securing the overlapped edges of the filter material strip and net strip together to form a sleeve about said tube;
second means spaced from said tube for intermittently applying tie means about the sleeve to close the sleeve on itself;
third means for moving a flow of aggregate through said tube for filling the sleeve with aggregate;
fourth means for moving the sleeve from said tube during filling of the sleeve with aggregate.

5. An apparatus as set forth in claim 4 wherein said first means adhesively secures the overlapped edges of the filter material strip and net strip together.

6. An apparatus as set forth in claim 4 further comprising a feed means for feeding a third strip of material over the overlapped edges of the first filter material strip and net strip to sandwich each longitudinal edge of the net strip between the first filter material strip and the third strip.

7. An apparatus as set forth in claim 6 wherein said first means adhesively secures the third material strip and the overlapped edges of the first strip and net strip together.

8. An apparatus as set forth in claim 7 wherein said first means includes a pair of valves on opposite sides of said tube for expelling adhesive between the net and the filter material.

9. An apparatus as set forth in claim 7 further comprising a pair of pressing rollers, each said pressing roller being disposed downstream of said first means to press a respective third strip and the respective overlapped edges of the first strip and net strip together.

10. An apparatus as set forth in claim 7 further comprising drive means for intermittently moving a pipe coaxially through said tube into a rear of the sleeve while filling the sleeve with aggregate.

11. An apparatus as set forth in claim 4 further comprising means for guiding a length of material through said tube while dispensing the aggregate into an annular space between the length of material passing out of said tube and the sleeve secured at one end to and moving with the length of material.

* * * * *